Nov. 21, 1967  T. S. ZASTROW  3,353,782

FOAM INSULATION FORMING DEVICE

Filed Oct. 2, 1964  2 Sheets-Sheet 1

INVENTOR.
THOMAS S. ZASTROW
BY
Meyers & Peterson
ATTORNEYS

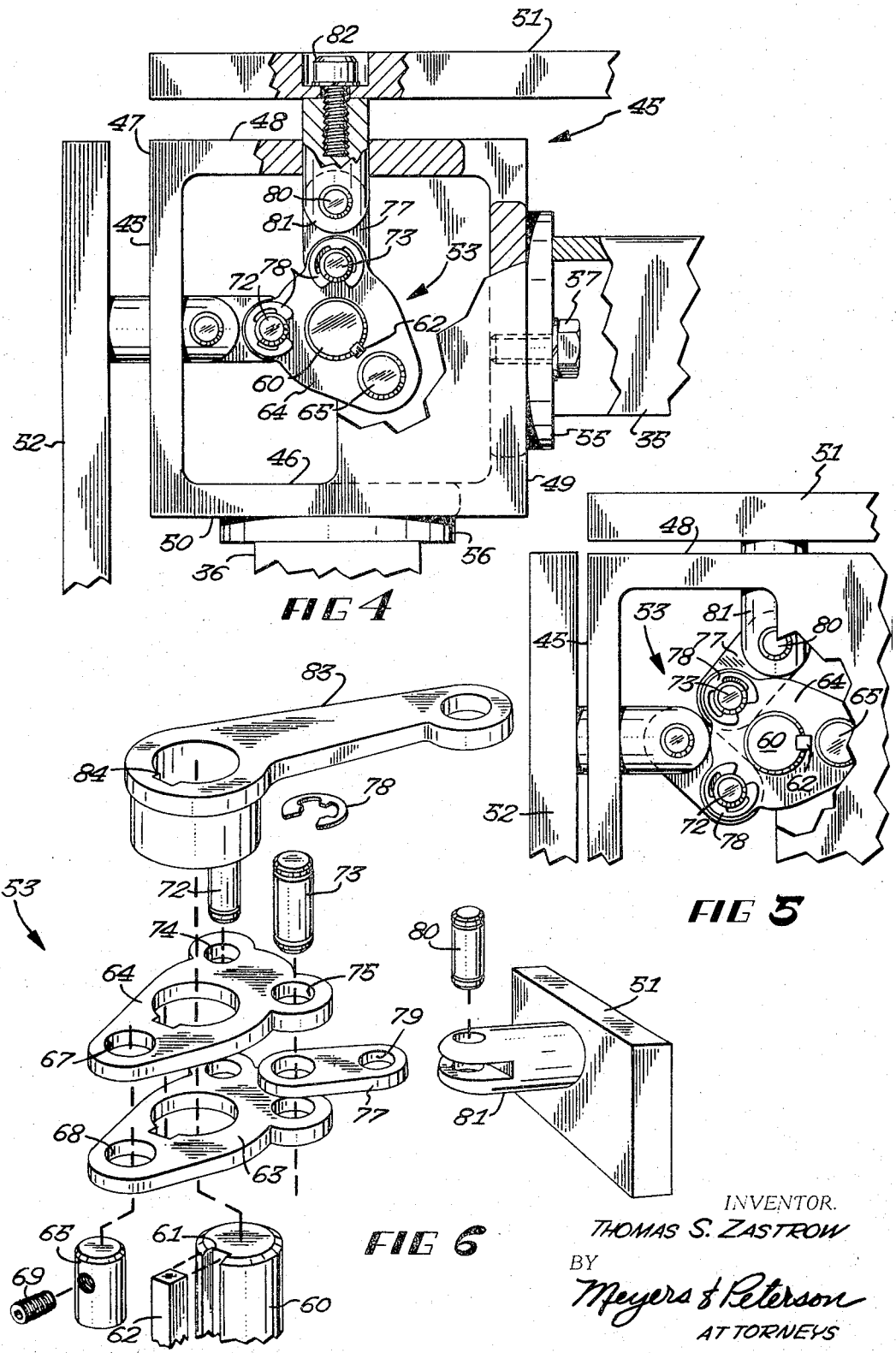

3,353,782
FOAM INSULATION FORMING DEVICE
Thomas S. Zastrow, St. Paul, Minn., assignor to Remmele Engineering, Inc., St. Paul, Minn., a corporation of Minnesota
Filed Oct. 2, 1964, Ser. No. 401,203
3 Claims. (Cl. 249—152)

The present invention relates generally to an apparatus for use in connection with forming and filling foamed-in-place resin in an annular cavity area between spaced substantially rigid surfaces, and more particularly to such an apparatus which is well adapted for use in connection with the formation of a panel comprising a foamed resin core arranged between two spaced apart solid surfaces.

Foamed-in-place resin is widely used at the present time, particularly for thermal insulation applications. In this connection, the insulation qualities as well as the mechanical properties of foamed-in-place resin insulation are exceptional, and generally preferred over the previously employed batt insulation. The thermal insulating qualities of a one inch thick barrier of foamed polyurethane resin having closed cell construction and of modest density is equivalent to several inches of conventional glass wool batt insulation. The refrigerator and freezer appliance industry normally employ a pair of spaced apart sheet metal surfaces having an annular insulation barrier interposed therebetween. The placing of a foamed-in-place resin in this area enhances the rigidity as well as certain other mechanical properties of the panel or surface, hence the structure may be provided with a substantially smaller insulation volume and a lighter metal shell than would be required with conventional batt insulation. Thus, for an equivalent exterior dimension, a maximum greater interior dimension is possible with foamed-in-place resins being used for thermal insulation purposes.

In the art of building these devices, the provision of a confining surface for the exterior of the panel or enclosure is relatively easily accomplished. However, the provision of a suitable inner core fixture is not as readily arranged. One specific requirement of the core fixture is that it be both expandable and collapsible. In other words, the core fixture must be capable of being expanded to an operative configuration, and thereafter collapsed in order to permit removal of the fixture from the finished product. This is normally accomplished subsequent to the expansion or foaming and substantial curing of the frothed resin mixture. Furthermore, appliances such as refrigerators and freezers generally have an unusual configuration including certain internal cavity areas for the accommodation of a compressor, as well as a pair of separated compartments or zones wherein the temperature in one zone is adapted to be held at a substantially different temperature level from that in the other zone. Thus, it is apparent that these enclosures, in order to be satisfactorily fabricated with foamed-in-place resin, must be provided with internally arranged or disposed rigid core fixtures which may be initially placed within the enclosure, expanded into the desired dimensional configuration, and then collapsed subsequent to the foaming operation in order to permit removal of the core fixture from the finished product.

It is also necessary to have careful dimensional control of the enclosures in order that the various appertances, such as doors or other mating panels may be mounted thereon in a substantially uniform manner from one unit to another. Thus mass production techniques may be employed when using the fixture apparatus of the present invention.

Briefly, in accordance with the present invention an expandable-collapsible core fixture is provided which has at least one surface which is movable relative to the remaining surface portions of the fixture. Preferably, the core fixture has a plurality of relatively movable surfaces which can be moved in order to expand or collapse the core fixture configuration. In order to accomplish relative movement of the fixture surfaces, toggle blocks are disposed at the corners of the upper and lower surfaces thereof and may also be positioned at spaced intervals along elongated walls. Each toggle block preferably has a rectangular configuration and normally has four surfaces adapted to be provided with either a movable surface or a spacer arm. Accordingly, each of these surfaces will have in contact therewith either a stationary spacer arm, or a relatively movable panel linked to the actuating mechanism and adapted for applying the force outwardly against the surface of the product in contact therewith. Therefore, an extreme situation could embody four or more relatively movable panel surfaces arranged to be urged outwardly against the inwardly directed force provided by the frothed resin, however this would be an exceptional situation inasmuch as conventional usage will generally employ four of these toggle blocks along each of the upper and lower surfaces of the fixture to form a core. A common linkage is utilized to simultaneously expand or collapse the core, this providing a simultaneous release of pressure at each of the surfaces, therefore minimizing physical distortion in the product and permitting early removal of the pressure from the expandable core fixture. In operation, the expandable core fixture will be disposed within the confines of an outer enclosure which is adapted to exert force against the outward expansion of the device being fabricated, the said device being disposed in the annular zone between the core fixture and the outer enclosure.

The individual toggle blocks forming the core are spaced apart by specific lengths of spacer arms such as channel iron or angle iron, the ends of the spacers being provided with means for securing the spacer arm to the face of the toggle block. Thus, the individual toggle blocks make it possible to produce insulated enclosures with a minimum of production equipment being required. These toggle blocks are salvagable and may be used in a variety of operations, hence each forms a building block for a core having a standard configuration. In order to modify the design, the spacers and/or the surface contacting plates are removed and a new set attached to the individual toggle blocks. Thus it is possible to modify the specific arrangement of the toggle blocks in order to accommodate a substantially different enclosure design, this changeover being accomplished without substantial expense and with standard equipment.

Therefore it is an object of the present invention to provide an improved expandable core fixture which is specifically adapted for versatility in adaptation to operations for maintaining a predetermined configuration in a operation wherein a frothed resin is foamed-in-place in an annular zone between a pair of spaced apart surfaces to form a solid panel.

It is a further object of the present invention to provide an improved apparatus and technique for preparing a device having a frothed or foamed-in-place resin disposed in an annular cavity zone therein, the foaming operation being accomplished while the outer and inner surfaces are rigidly and securely held in place by means of an internally disposed highly versatile expansible core fixture member.

It is yet a further object of the present invention to provide an improved expansible core for use in connection with foamed-in-place resin, and wherein the expansible core comprises a plurality of individually spaced toggle blocks having means for expanding and contracting the movable surfaces thereof simultaneously as required.

Other and further objects of the present invention will become apparent to those skilled in the art upon consideration of the following description, appended claims, and accompanying drawings wherein:

FIGURE 4 is a detail plan view, partially broken away and on an enlarged scale showing the details of a toggle block prepared in accordance with the present invention and having two relatively movable surfaces and two spacer bars in contact therewith;

Figure 1:
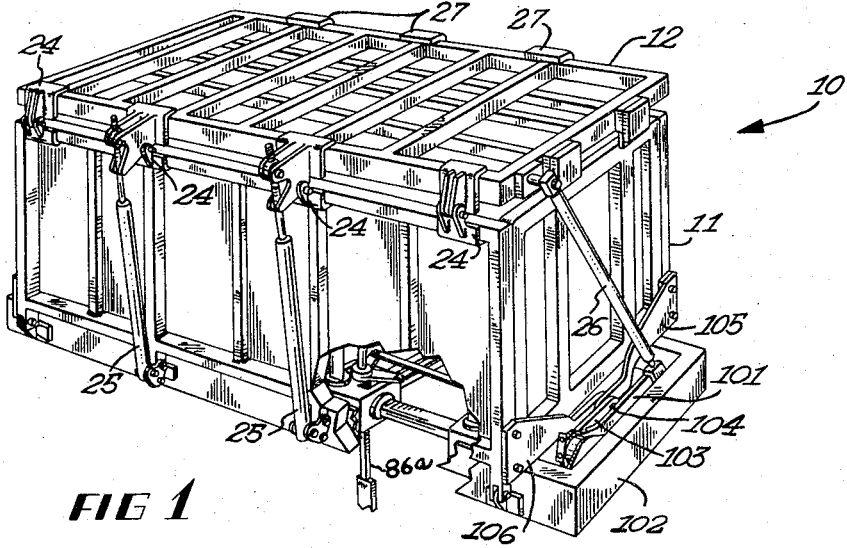
FIGURE 1 is an exterior surface of an enclosure adapted to receive a device such as a refrigerator or freezer body or box therein, and thereafter being provided with a foamed-in-place resin thermal insulation layer, a portion of the enclosure being shown broken away to expose the inner co-operating portions of the core fixture.

FIGURE 5 is a fragmentary view similar to the device of FIGURE 4, and showing the toggle mechanism in contracted form; and FIGURE 6 is an exploded detail view of the components utilized in assembling the interior mechanism for various toggle blocks, the mechanism of FIGURE 6 being similar to the mechanism used in the block of FIGURES 4 and 5 and being provided with a pair of relatively movable surfaces.

In accordance with the preferred modification of the present invention, the foamed-in-place cavity defining fixture generally designated 10 includes an outer enclosure body 11 having top member 12 which is capable of being locked securely in place over the frame provided by the enclosure body 11. The interior of the zone defined by the enclosure 11 is adapted to receive a refrigerator enclosure shell 13 which comprises an inner sheet metal or surface member 15 and an outer sheet metal or surface member 16 defining an annular cavity 14, together with an angular inner divisional member 18, which likewise includes a pair of spaced sheet metal surfaces 19 and 20 spaced apart across the annular cavity 21. The device contained within the fixture is conveniently a refrigerator device which requires one temperature level to be maintained in the enclosure disposed at the upper portion and to the right of FIGURE 2, and another temperature level to be maintained within the enclosure in the lower portion and to the left of FIGURE 2. Since both enclosures will be maintained at a temperature which varies from that of the ambient, the entire unit is enclosed by foamed-in-place insulating resin material.

It will be appreciated that the dimensions, particularly the inner wall dimensions of the enclosure 11 may be prepared in accordance with the dimensions of the outer wall of the refrigerator enclosure 13 will abut the inner surface of the enclosure 11. The top member 12 which is hingedly attached to the body portion 11 is utilized in order to form an abutting surface for the edge of the refrigerator enclosure 13. For convenience, the top member 12 is hingedly supported on the body member 11 as by the hinges 24—24, each hinge being provided with an independent pivot axis as illustrated. In order to lighten the mechanical load on the top, suitable counterbalance springs 25—25 are provided. A lateral lifting arm is provided as at 26, and suitable latching means are provided at the front side of the unit as at 27—27.

The inner surfaces of the enclosure 13 are arranged to abut the outer surfaces of the collapsible core members such as the core fixtures 30, 31, 32, and 33. Prior to initiation of the frothing reaction of the foamed-in-place resin, the individual collapsible cores are mounted in place, as indicated. The relative dimensions of each of the collapsible cores is determined, at least in part, by the length of the individual spacer bars 35, 36, 37, 38 and 39. Other dimensions are held by means of the remaining individual spacer bars as shown and not individually mentioned hereinabove.

Particular attention is now directed to FIGURES 4 and 5 wherein the individual toggle blocks which are identical to those toggle blocks which comprise the corner elements of each of the core members 30, 31, 32, and 33 are illustrated in detail. It will be appreciated that certain toggle blocks may be provided at the center portion of an elongated surface such as the toggle blocks 40 and 41 in the assembly 30 whenever the length of the span dictates. The toggle block shown in FIGURE 4, and generally designated 45 comprises a main frame 46 with four exterior faces 47, 48, 49, and 50. The surfaces 47 and 48 are provided with movable pressure plates or surfaces at 51 and 52, these plates being adapted for reciprocal inward movement as shown in FIGURE 4 by means of interiorly disposed cam assembly 53 to be described more fully hereinafter. This action expands and contracts the core fixture. The surfaces 49 and 50 make contact with or are otherwise secured to the spacer elements 35 and 36, these spacer elements or bars being welded or otherwise attached to a shoe such as the shoes 55 and 56, the individual shoes being securely mounted adjacent the face of the block 45 as illustrated at 57.

It will be appreciated that each of the toggle blocks which are disposed or mounted in a corner situation function identically with the block 45 and hence will not be described in any detail individually. Referring now to FIGURE 6 in addition to FIGURES 4 and 5, it will be seen that each toggle block is provided with a shaft 60 which is journaled for rotation in the block body. The shaft 60 has a keyway 61, a key 62, and carries a pair of axially spaced cam elements 63 and 64 thereon. The locking pin 65 is forced or pressed into the axially aligned holes 67 and 68, and the set screw 69 is utilized to maintain constant locking pressure against the key 62 through the threaded bore which is provided in the locking pin 65, as indicated in FIGURE 6. The compound right angle toggle links, which for convenience are referred to as the cam elements 63 and 64, when locked in axially spaced disposition along the shaft 60 are provided with pins 72 and 73, which are adapted to be received in the bores provided at 74 and 75, the intermediate portion of the pins 72 and 73 being adapted to receive the axially pivotable links 77 therearound. Locking rings such as the locking rings 78—78 are arranged to retain the pins 72, 73, and 90 in proper disposition. The link 77 is provided with a pin receiving bore 79 at the free end thereof, the pin member 80 being adapted to pass through the bore provided in the forked connector 81 with the link 79 being disposed in the slot area thereof. The connector 81 is attached by means of the bolt 82 or by other suitable means to the movable pressure plate 51. As previously indicated, the other toggle blocks are similarly fashioned and hence it is felt that the description of this unit will suffice as a description for all.

The shaft 60, together with the cam elements 63 and 64 are adapted for pivotal rotation by means of the lever crank 83, which is provided with a boss area as at 84 in order to transfer rotational energy to the shaft 60.

The rotation of the cam elements 63 and 64 controls the relative disposition of the various pressure plates such as the plates 51 and 52. In the expanded disposition as shown in FIGURE 4, the lever crank 83 has previously been moved in a clockwise direction in order to achieve this form. As shown in FIGURE 5, the lever crank 83 has been pivotally rotated in a counter-clockwise direction in order to cause the collapse or recession of the pressure plates 51 and 52 to a position adjacent to the surfaces 47 and 48 of the toggle block 45.

Figure 3:
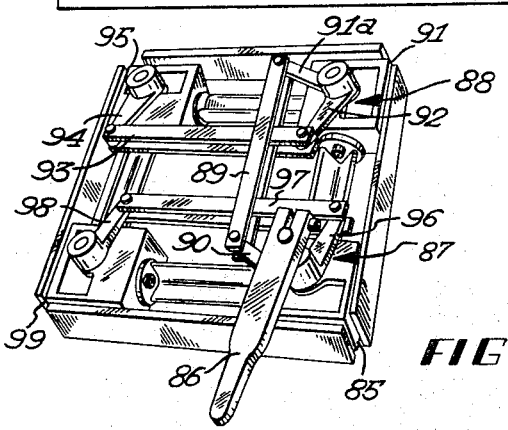
FIGURE 3 is an isometric view of a single layer of toggle blocks and showing the movable surfaces, the spacer arms, and the interconnecting linkages provided for simultaneous actuation of the movable surfaces.

Particular attention is now directed to FIGURE 3 of the drawings wherein a complete assembly is illustrated, and showing the manner in which each of the pressure plates may be moved outwardly simultaneously. In this connection, the crank arm 86 is secured to one of the individual shafts 60, or to an extension thereof. A locking screw or the like as shown at 87 is utilized to clamp the crank arm 86 onto the shaft 60. The rotation of this shaft causes a corresponding rotation to occur in the individual lever cranks which are secured to the common shaft with the arm 86, such as the bell cranks 87 and 88, the arms of the cranks 87 and 88 are preferably disposed at right angles to one another. The linking arms 89 extend from the arm 90 of crank 87 to the arm 91 of bell crank 90, which is locked to a separate central shaft of the toggle block 91. The bell crank 88 is provided with a second crank arm 92 which is likewise provided with a pair of link arms 93 which transfer movement of the lever crank 94 of the toggle blocks 95. The second arm 96 of bell crank 87 is provided with a pair of link arms 97 which transfer motion to the lever crank 98 of the toggle block 99. The remaining surfaces of the individual toggle blocks 85, 91, 95, and 99 are secured to individual spacer arms, as illustrated.

The design of the outer shell 11 is not critical to the invention, and the shell described herein is deemed typical and useful. For example, an outer shell may be employed which permits attachment of the individual end walls and side walls in a variety of different combinations. Thus, the versatility of the toggle block system wherein the dimension of the core may be modified by merely substituting different spacer bars may be complimented by an outer shell capable of having different dimensions assigned to the individual wall surfaces thereof. One of the features of the enclosure shown in FIGURE 1 is that the opening of the enclosure releases the pressure simultaneously from essentially all portions of the exterior surfaces of the work. With particular attention being directed to FIGURE 1, it is seen that the lateral lifting arm 26 is secured at its lower end to a transverse pivotal crank arm 101, the crank arm 101 being secured in turn for pivotal rotation on a short shaft, not shown, the shaft being firmly mounted on the frame 102. As seen in FIGURE 1, the arm 101 is adapted to pivot with the second link arm 103 which, in turn, has a pivot pin 104 secured in the free end thereof, the pin 104 being received in a slot in the actuating arm of members 105 and 106. The pin 104 couples the arm 105 to the arm 106, the arms 105 and 106 being secured, as indicated, to the individual front and back walls of the enclosure 11. Thus, with continued reference to FIGURE 1 it will be seen that the counterclockwise rotation of the arm 101 will cause the pivot pin 104 to move vertically upwardly and this motion of the linkage will open the outer wall surfaces of the enclosure 11 away from the area of the work. Thus, a single lifting action on the link arm opens the side walls to permit easy withdrawal of the work from the fixture after internal pressure is released. Furthermore, in order to preserve the quality of the work, the opening of the sidewalls defining the enclosure occurs substantially simultaneously, thus relieving the pressure along all surfaces at one time. This has been found to avoid distortion from being introduced into the work, the pressure being equalized throughout the entire area of the work surfaces.

In utilizing the apparatus of the present invention, the enclosure 11 will be initially opened, and the work positioned within the enclosure with the lower edge surface being rested upon a suitable rail or the like. The individual toggle block core assemblies are then placed within the confines of the work, and when each of these is in place, a crank such as the crank 86 is turned and each of the individual toggle block assemblies is opened. Generally, the linkages are all tied together in order to open all of the individual assemblies simultaneously with one lever aution. Such a lever is shown at 86A in FIGURE 1. In other words a single shaft movement coupled to each of the shafts in the assembly may actuate all of the blocks. When completed, the enclosure 11 is closed, the cover member 12 secured thereto, and the foam-in-place resin is caused to expand within the chamber. Upon completion of the foaming reaction, and upon completion of substantial cure of the resin, the cover is lifted, the individual toggle block assemblies collapsed, and the work is removed from the enclosure. The apparatus is then ready for a subsequent operation cycle.

Because of the complexities of internal design, it is normally a prerequisite that the actuating linkage be operated with a minimum of individual expanding operations. This feature enables more uniformity to be obtained in the finished products, this being obtained with a minimum degree of adjustment being required during the production operation.

In order to assist the assembly in obtaining uniform pressure throughout the product, and thus avoid the introduction of deformities along the product wall, the entire volume which is being provided with the frothed resin insulation is in common communication. Therefore, any excessive quantities or deficient quantities of raw resin material in one local area may be compensated for over-all by providing open communication between the various areas undergoing simultaneous expansion. The internally disposed expandable core fixture will not shift physically during the expansion operation and uniform product dimensions are accordingly achieved.

Figure 2:
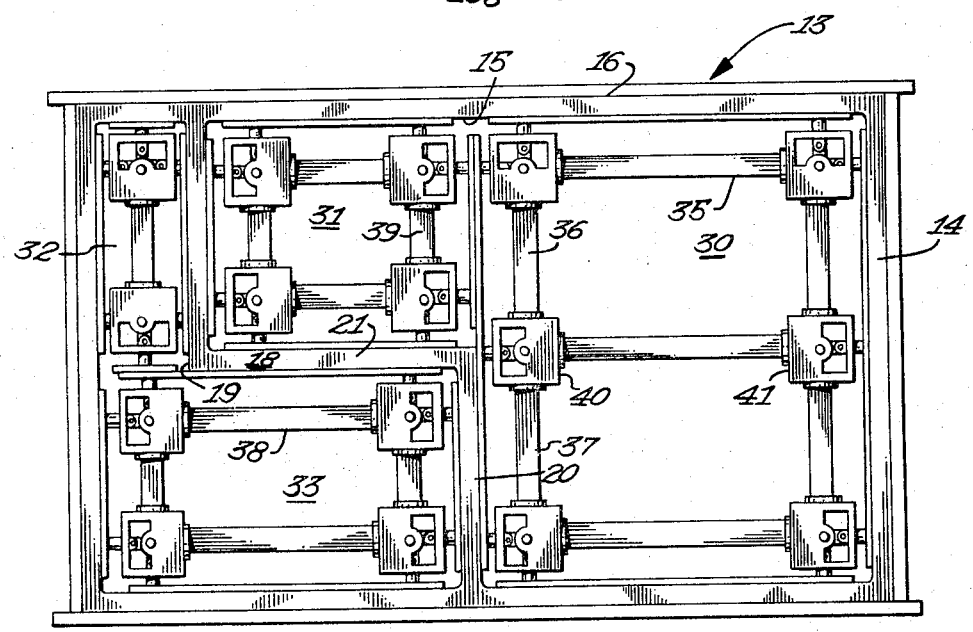
FIGURE 2 is a top plan view of a completed enclosure showing the inner and outer enclosure walls, the material to be subjected to the foamed-in-place operation being arranged in the annular area therebetween, and also showing the upper layer of toggle blocks which are shown in expanded configuration.

In an assembly such as is shown in FIGURES 1 and 2 of the drawings, the depth is such that two planes of toggle blocks are required for each individual core assembly. In this case, the vertical struts separating the individual planes of blocks will be off-set from the center of the block in order to permit a coupling shaft to be arranged between the individual planes. In this connection, the actuating linkage on the upper plane of toggle blocks will normally be disposed below that particular set of blocks, and the actuating linkage on the lower plane blocks will be disposed above the blocks. Therefore, little interference exists between the individual sets of blocks in the work.

For many refrigeration designs, it is desirable that the work be placed within the confines of the forming device with the door opening positioned downwardly. In this type of device, it will be necessary to provide a supporting surface for the upper part of the structure. Therefore, a planar surface such as a board or the like will be used on top of the individual toggle assemblies in order to provide an appropriate working surface.

It will, of course, be understood that various changes may be made in the form, details, arrangements, and proportions of the parts without departing from the scope of the invention as set forth in the appended claims.

What is claimed is:

1. In apparatus for applying mechanical pressure to an article retained within external and internal walls defining a chamber during the frothing of a resin within said article, the article comprising a hollow structure having outer wall surfaces enclosing a core zone therebetween;
 (a) an outer shell for said chamber adapted to receive said hollow core structure and having an inner wall disposed in abutting relationship to the outer wall surface of the hollow core structure of said article, and having means for blocking the walls of said outer shell in predetermined relative disposition; and
 (b) internal toggle means having externally arranged surface adapted to be disposed in abutting relationship to the inner surfaces of said hollow shell, said internal toggle means comprising at least two spaced pivot blocks and at least two axially spaced rotatable shafts, each of said shafts being mounted within one of said pivot blocks and being journaled for pivotal rotation therewithin, eccentric means secured to each such shaft and adapted for rotation therewith and having an over-center toggle action providing a stable expanded disposition, a toggle linkage adapted for radial movement with respect to each said shaft and responsive to axial rotation thereof for coupling said eccentric means to said externally arranged surfaces, means for rotating each of said shafts, and means radially spaced from said shafts for coupling the rotation of each of said shafts between at least two of said pivot blocks.

2. The apparatus as defined in claim 1 being particularly characterized in that said toggle linkage coupling means includes a common linkage tied together with a single actuating rod.

3. The apparatus as defined in claim 1 being particularly characterized in that a pivot block is provided in each corner of said article.

References Cited

UNITED STATES PATENTS

| | | | |
|---|---|---|---|
| 1,363,651 | 12/1920 | Hutchins | 249—152 X |
| 1,388,376 | 8/1921 | Ruppel | 249—180 X |
| 1,670,066 | 5/1928 | Erickson | 249—152 |
| 2,557,631 | 6/1951 | Callan | 249—178 |

FOREIGN PATENTS 340,178  9/1959  Italy.

J. SPENCER OVERHOLSER, *Primary Examiner.*

E. MAR, *Assistant Examiner.*